(12) United States Patent
Machida et al.

(10) Patent No.: US 10,717,200 B2
(45) Date of Patent: Jul. 21, 2020

(54) SURROUNDING MONITORING DEVICE OF WORK MACHINE AND METHOD OF MONITORING SURROUNDINGS OF WORK MACHINE

(71) Applicant: Komatsu Ltd., Tokyo (JP)

(72) Inventors: Masaomi Machida, Hiratsuka (JP); Takeshi Kurihara, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 72 days.

(21) Appl. No.: 15/507,867

(22) PCT Filed: Mar. 16, 2016

(86) PCT No.: PCT/JP2016/058396
§ 371 (c)(1),
(2) Date: Mar. 1, 2017

(87) PCT Pub. No.: WO2016/174953
PCT Pub. Date: Nov. 3, 2016

(65) Prior Publication Data
US 2017/0305018 A1 Oct. 26, 2017

(30) Foreign Application Priority Data

Apr. 28, 2015 (WO) .................. PCT/JP2015/062910

(51) Int. Cl.
*H04N 7/00* (2011.01)
*B25J 19/02* (2006.01)
(Continued)

(52) U.S. Cl.
CPC .......... *B25J 19/023* (2013.01); *B25J 9/1674* (2013.01); *B25J 19/06* (2013.01); *B60R 1/00* (2013.01);
(Continued)

(58) Field of Classification Search
CPC ... H04N 7/00; H04N 5/00; B60R 1/00; B60R 11/00; G06T 11/60
See application file for complete search history.

(56) References Cited

U.S. PATENT DOCUMENTS 6,327,522 B1 * 12/2001 Kojima .................. B60K 35/00
348/115
9,292,981 B2   3/2016 Kimura
(Continued)

FOREIGN PATENT DOCUMENTS

CN      103797789 A    5/2014
JP      2011-071919 A  4/2011
(Continued)

OTHER PUBLICATIONS

International Search Report dated Apr. 12, 2016, issued for PCT/JP2016/058396.
(Continued)

*Primary Examiner* — Maryam A Nasri
(74) *Attorney, Agent, or Firm* — Locke Lord LLP

(57) ABSTRACT

A surrounding monitoring device of a work machine includes: a display unit; a plurality of cameras acquiring a surrounding condition of the work machine; an image processing unit generating a bird's-eye image indicating the surrounding condition of the work machine on the basis of images imaged by the cameras; a work machine operation detection unit detecting an operation of the work machine; and a display control unit displaying, on the display unit, a single camera image imaged by one or more cameras, of the plurality of cameras, the bird's-eye image, mechanical gauge display, menu display, and/or breakdown information display. Further, when the operation of the work machine is detected, the display control unit performs control of enlarging surroundings of the work machine on the bird's-eye (Continued)

image, compared with surroundings of the work machine on the bird's-eye image before the operation of the work machine is detected.

5 Claims, 10 Drawing Sheets

(51) Int. Cl.
| | | |
|---|---|---|
| H04N 7/18 | (2006.01) | |
| E02F 9/26 | (2006.01) | |
| G06K 9/00 | (2006.01) | |
| F16P 3/14 | (2006.01) | |
| B60R 11/00 | (2006.01) | |
| B60R 1/00 | (2006.01) | |
| G06T 11/60 | (2006.01) | |
| B25J 9/16 | (2006.01) | |
| B25J 19/06 | (2006.01) | |
| H04N 5/00 | (2011.01) | |

(52) U.S. Cl.
CPC ............. *B60R 11/00* (2013.01); *E02F 9/261* (2013.01); *E02F 9/267* (2013.01); *F16P 3/147* (2013.01); *G06K 9/00791* (2013.01); *G06T 11/60* (2013.01); *H04N 7/181* (2013.01); *F16P 3/142* (2013.01); *H04N 5/00* (2013.01)

(56) References Cited

U.S. PATENT DOCUMENTS

| | | |
|---|---|---|
| 9,497,422 B2 | 11/2016 | Mitsuta et al. |
| 2010/0079367 A1* | 4/2010 | Yokota .................. B60K 35/00 345/102 |
| 2013/0182066 A1 | 7/2013 | Ishimoto |
| 2014/0354813 A1* | 12/2014 | Ishimoto ................ H04N 7/181 348/148 |
| 2015/0254911 A1 | 9/2015 | Kimura |
| 2016/0024758 A1 | 1/2016 | Ishimoto et al. |

FOREIGN PATENT DOCUMENTS

| | | |
|---|---|---|
| JP | 2012-046124 A | 3/2012 |
| JP | 2012-074929 A | 4/2012 |
| JP | 2012-082608 A | 4/2012 |
| JP | 2013-142228 A | 7/2013 |
| JP | 2014-180046 A | 9/2014 |
| JP | 2015-076645 A | 4/2015 |
| WO | 2015025370 A1 | 2/2015 |
| WO | 2015/029110 A1 | 3/2015 |

OTHER PUBLICATIONS

Office Action dated Feb. 22, 2018, issued for the corresponding Canadian patent application No. 2,959,480.

* cited by examiner

R1, R2   R3, R7   R4, R8

SURROUNDING MONITORING DEVICE OF WORK MACHINE AND METHOD OF MONITORING SURROUNDINGS OF WORK MACHINE

CROSS REFERENCE TO RELATED APPLICATIONS

This application is related to co-pending application: "SURROUNDING MONITORING DEVICE FOR WORK MACHINE" filed even date herewith in the names of Masaomi MACHIDA and Takeshi KURIHARA as a national phase entry of PCT/JP2016/057236, which application is assigned to the assignee of the present application and is incorporated by reference herein.

FIELD

The present invention relates to a surrounding monitoring device of a work machine and a method of monitoring surroundings of a work machine, which can reduce a troublesome operation of a display screen by an operator, when an operation to operate the work machine is performed.

BACKGROUND

In the field of work machines such as hydraulic excavators, there is a work machine in which a plurality of cameras are installed on the rear and/or the side of a vehicle body, in addition to mirrors, so that an operator (driver) can visually recognize an obstacle existing in the surroundings of the vehicle body. Then, images imaged by the cameras are displayed on a monitor in a driver's cab of the work machine, as single camera images.

Further, there is a work machine that converts images of respective cameras into images with an upper viewpoint and then composites the images of the respective cameras to generate a bird's-eye image, and displays the generated bird's-eye image on a monitor so that an operator can monitor 360-degree surroundings of a vehicle body at the same time. Further, there is a work machine that displays a single camera image imaged by a camera selected by an operator on a monitor, in addition to a bird's-eye image (see Patent Literature 1).

CITATION LIST

Patent Literature

Patent Literature 1: JP 2012-74929 A

SUMMARY

Technical Problem

By the way, a work device of the hydraulic excavator swings around the entire periphery, and thus when an obstacle exists in the surroundings of the hydraulic excavator, there is a possibility that the work device collides with the obstacle when an upper swing body swings. To avoid such a collision, it is important to provide an operator with an image that displays 360-degree surroundings of the hydraulic excavator in a bird's-eye manner. However, the bird's-eye image is a composition of an image group of single camera images that are converted into images with an upper viewpoint, and is not suitable to confirm an object appearing in the image in more detail. Therefore, as described above, there is a work machine that displays the single camera image together with the bird's-eye image on the same monitor. In a case where the bird's-eye image and the single camera image are displayed on such a monitor at the same time, the screen size of the bird's-eye image becomes smaller than that of the case where only the bird's-eye image is displayed due to the limited space of the monitor screen. Since the bird's-eye image is one image obtained by compositing the plurality of camera images, there is a problem that the object appearing in the image is difficult to distinguish if the bird's-eye image is small.

Further, in a case where an obstacle exists in the surroundings of the hydraulic excavator, the possibility that the hydraulic excavator collides with the obstacle when performing an operation such as a travel operation or a swing operation becomes high. Therefore, it is favorable to display the bird's-eye image that can display a surrounding condition of the hydraulic excavator larger when a travel lever or a swing lever is operated.

The present invention has been made in view of the foregoing, and an object is to provide a surrounding monitoring device of a work machine and a method of monitoring surroundings of a work machine, which make a display region of a bird's-eye image large when an operation to operate the work machine is performed, thereby to enable an operator to easily confirm a surrounding condition of the work machine.

Solution to Problem

To resolve the above problem and attain the object, according to the present invention, a surrounding monitoring device of a work machine includes: a display unit; a plurality of cameras acquiring a surrounding condition of the work machine; an image processing unit generating a bird's-eye image that indicates the surrounding condition of the work machine on the basis of images imaged by the plurality of cameras; a work machine operation detection unit detecting an operation of the work machine; and a display control unit displaying, on the display unit, a single camera image imaged by one or a plurality of the cameras, of the plurality of cameras, the bird's-eye image, mechanical gauge display, menu display, and/or breakdown information display. Further, when the operation of the work machine is detected, the display control unit performs control of enlarging surroundings of the work machine on the bird's-eye image, compared with surroundings of the work machine on the bird's-eye image before the operation of the work machine is detected.

According to the present invention, in the surrounding monitoring device of a work machine according to the above aspect of the present invention, the work machine operation detection unit detects an operation of an operation lever and/or a travel lever.

According to the present invention, the surrounding monitoring device of a work machine according to the above invention further includes a plurality of radars that detects an obstacle in the surroundings of the work machine. Further, the display control unit detects the obstacle on the basis of information acquired by the plurality of radars, and displays obstacle information on the display unit when the obstacle exists.

According to the present invention, the surrounding monitoring device of a work machine according to the above invention, further includes an abnormality determination unit determining that an abnormality has occurred in the work machine. Further, the display control unit does not enlarge the bird's-eye image on the display unit even if the operation of the work machine is detected, when the abnormality determination unit determines that some sort of abnormality has occurred in the work machine.

According to the present invention, a surrounding monitoring device of a work machine includes a display unit; a plurality of cameras acquiring a surrounding condition of the work machine; an image processing unit generating a bird's-eye image that indicates the surrounding condition of the work machine on the basis of images imaged by the plurality of cameras; a display control unit displaying, on the display unit, a single camera image imaged by one or a plurality of the cameras, of the plurality of cameras, mechanical gauge display, menu display, and/or breakdown information display, in addition to the bird's-eye image; and an instruction unit instructing enlargement of surroundings of the work machine on the bird's-eye image. Further, the display control unit performs processing of enlarging the surroundings of the work machine on the bird's-eye image in response to an operation with the instruction unit.

According to the present invention, in the surrounding monitoring device of a work machine according to the above invention, the display unit is provided to a remote operation seat, a control room, or a portable terminal.

According to the present invention, a surrounding monitoring device of a work machine includes a display unit; a plurality of cameras acquiring a surrounding condition of the work machine; an image processing unit generating a bird's-eye image on the basis of images imaged by the plurality of cameras; a work machine operation detection unit detecting an operation of the work machine; and a display control unit displaying, on the display unit, a single camera image imaged by one or a plurality of the cameras, of the plurality of cameras, the bird's-eye image, mechanical gauge display, menu display, and/or breakdown information display. Further, when a swing operation of the work machine is detected, the display control unit performs control of enlarging a display region of the bird's-eye image on the display unit, compared with a display region of the bird's-eye image before the swing operation of the work machine is detected.

According to the present invention, a method of monitoring surroundings of a work machine includes: acquiring a surrounding condition by a plurality of cameras provided in surroundings of a work machine; generating a bird's-eye image that indicates the surrounding condition of the work machine on the basis of images imaged by the plurality of cameras; detecting an operation of the work machine; displaying, on a display unit, a single camera image imaged by one or a plurality of the cameras, of the plurality of cameras, the bird's-eye image, mechanical gauge display, menu display, and/or breakdown information display; and performing, when detecting the operation of the work machine, control of enlarging surroundings of the work machine on the bird's-eye image, compared with surroundings of the work machine on the bird's-eye image before detecting the operation of the work machine.

According to the present invention, the control of enlarging the surroundings of the work machine on the bird's-eye image, compared with the surroundings of the work machine on the bird's-eye image before the operation of the work machine is detected, is performed when the operation of the work machine is detected. Therefore, a troublesome operation of a display screen by an operator can be reduced.

DESCRIPTION OF EMBODIMENTS

Hereinafter, embodiments for implementing the present invention will be described with reference to the accompanied drawings.

[Overall Configuration of Hydraulic Excavator]

Figure 1:
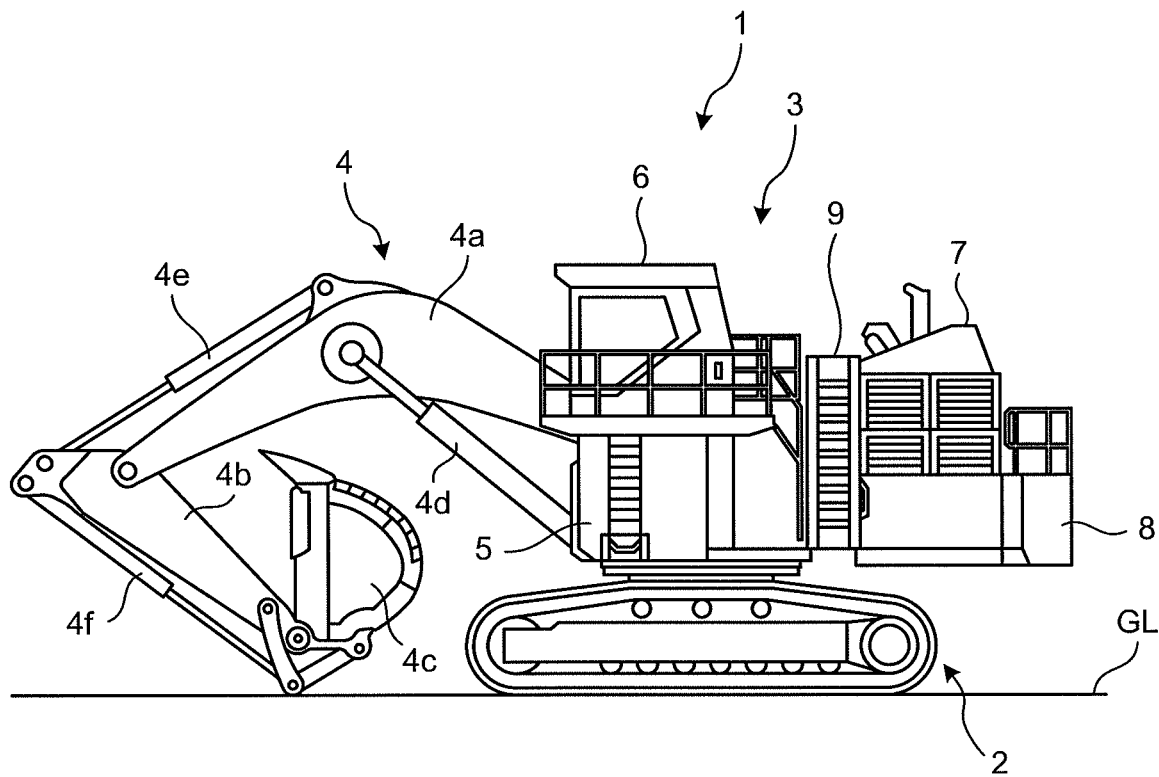
FIG. 1 is a side view illustrating an overall configuration of a hydraulic excavator in which a surrounding monitoring device of a work machine according to an embodiment of the present invention is mounted.

First, FIG. 1 is a side view illustrating an overall configuration of a hydraulic excavator in which a surrounding monitoring device of a work machine according to an embodiment of the present invention is mounted. This hydraulic excavator 1 is a large hydraulic excavator, such as a mining hydraulic excavator used in a mine or the like, illustrated as an example of the work machine. The hydraulic excavator 1 includes a self-propelled lower traveling body 2, an upper swing body 3 arranged on the lower traveling body 2 in a freely swingable manner, and a work machine 4 operated in a freely foldable and derrickable manner in a front center of the upper swing body 3.

The work machine 4 includes a boom 4a, an arm 4b, a bucket 4c, a boom cylinder 4d, an arm cylinder 4e, and a bucket cylinder 4f. A base end part of the boom 4a is rotatably coupled with the upper swing body 3. A distal end part of the boom 4a is rotatably connected with a base end part of the arm 4b. A distal end part of the arm 4b is rotatably connected with the bucket 4c. The boom cylinder 4d, the arm cylinder 4e, and the bucket cylinder 4f are hydraulic cylinders driven by working oil discharged from a hydraulic pump (not illustrated). The boom cylinder 4d operates the boom 4a. The arm cylinder 4e operates the arm 4b. The bucket cylinder 4f is coupled with the bucket 4c through a link member, and operates the bucket 4c. A cylinder rod of the bucket cylinder 4f performs an extension/contraction operation, so that the bucket 4c is operated. Note that, in FIG. 1, the hydraulic excavator 1 functions as a backhoe with an opening of the bucket 4c facing a swing center. However, the hydraulic excavator 1 may function as a front hydraulic excavator with the opening of the bucket 4c facing outward from the swing center.

A driver's cab 6 is installed on a front left side part of the upper swing body 3 through a cab base 5. A power container 7 is mounted on a rear part of the upper swing body 3. In the power container 7, an engine, a hydraulic pump, a radiator, an oil cooler, and the like are accommodated. A counter weight 8 is attached to a rear end part of the upper swing body 3. An up-and-down ladder 9 is arranged on a left side part of the upper swing body 3 to be positioned in the rear of the cab base 5. The up-and-down ladder 9 assists up and down of the driver or a maintenance worker to/from the upper swing body 3.

[Driver's Seat]

Figure 2:
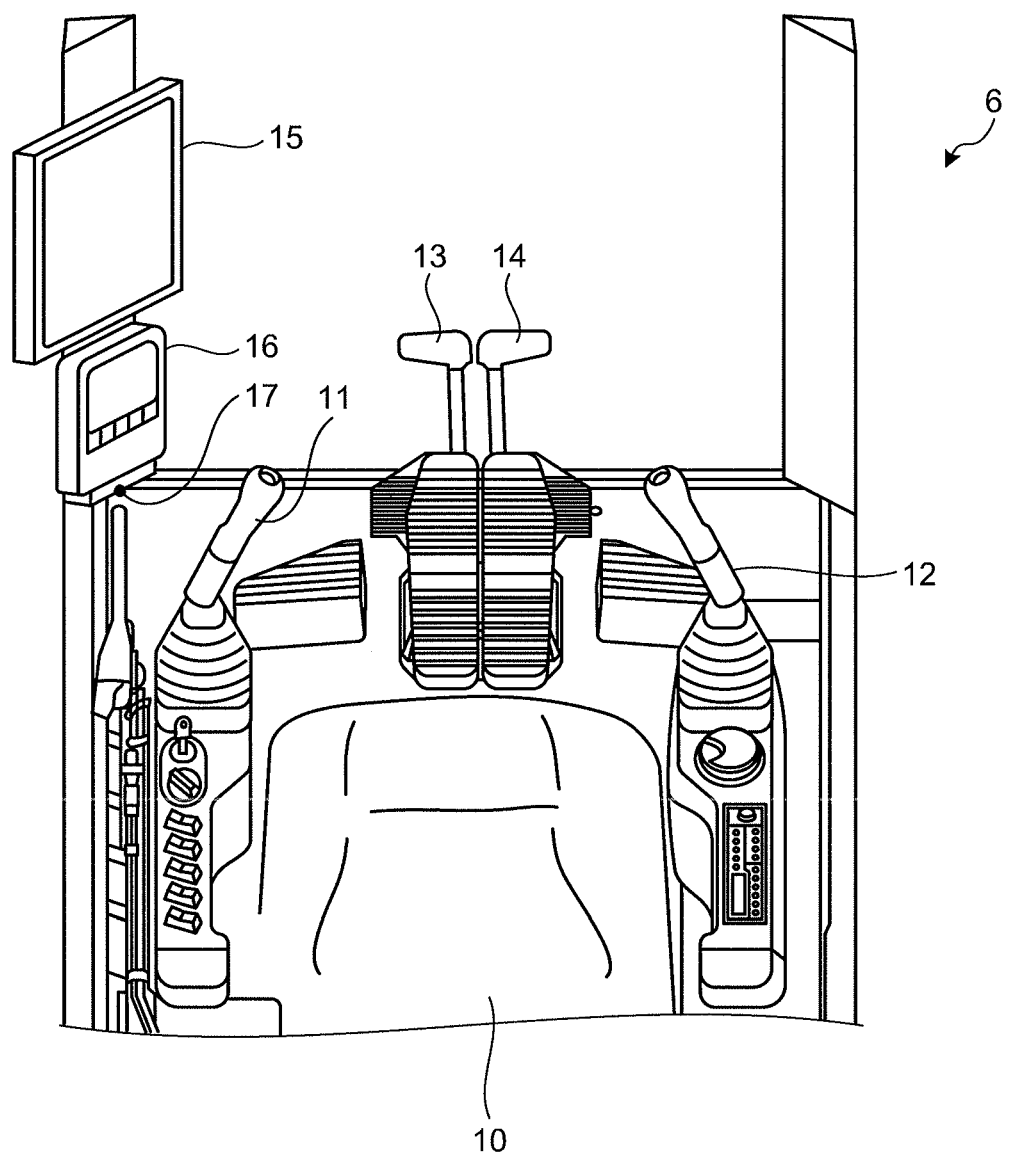
FIG. 2 is a diagram illustrating an internal arrangement of a driver's cab.

FIG. 2 is a diagram illustrating an internal arrangement of the driver's cab 6. As illustrated in FIG. 2, operation levers 11 and 12 are arranged on the right and left of an operator seat 10 in the driver's cab 6. The operation lever 11 is arranged on the left hand side when the operator sits on the operator seat 10. The operation lever 12 is arranged on the right hand side when the operator sits on the operator seat 10. The operation lever 11 corresponds to a swing operation of the upper swing body 3 and an operation of the arm 4b. When the operation lever 11 is operated right and left, the upper swing body 3 swings right and left, and when the operation lever 11 is operated up and down, the arm 4b is rotated in a front and rear direction. The operation lever 12 corresponds to an operation of the boom 4a, and an operation of the bucket 4c. When the operation lever 12 is operated right and left, the bucket 4c is rotated in an excavating/soil removing direction, and when the operation lever 12 is operated up and down, the boom 4a is rotated in the up and down direction. Note that the combinations of the operations of the operation levers 11 and 12, and the operations of which work devices are not limited to the present embodiment.

A travel lever 13 can advance/reverse a left-side crawler belt of the lower traveling body 2 in response to an operation. Further, a travel lever 14 can advance/reverse a right crawler belt of the lower traveling body 2 in response to an operation. For example, when only the travel lever 13 is operated to advance the left crawler belt, the right crawler belt remains stopped although only the left crawler belt is advanced, and thus the lower traveling body 2 performs an travel and swing operation clockwise. Further, when only the travel lever 14 is operated to advance the right crawler belt, the left crawler belt remains stopped although only the right crawler belt is advanced, and thus the lower traveling body 2 performs an travel and swing operation anticlockwise. When the travel levers 13 and 14 are operated at the same time, the right and left crawler belts are driven at the same time, and the entire hydraulic excavator 1 can be advanced/reversed.

Further, a surrounding monitoring monitor 15, a monitor 16, and a buzzer 17 are arranged on a front left frame of the driver's cab 6. The surrounding monitoring monitor 15 is an input/output device formed of a touch panel, and can display at least a surrounding condition of the hydraulic excavator 1 acquired by a plurality of cameras, as a bird's-eye image and a single camera image. The monitor 16 is an input/output device including a liquid crystal display unit and a key input unit. The monitor 16 can display various types of information including states of the engine, the hydraulic pump, and the like. For example, the monitor 16 can display mechanical gauge display such as an engine water temperature, an oil temperature, a residual amount of fuel, breakdown information (including icons for warning occurrence of abnormality) indicating information of what type of abnormality has occurred in the various devices of the hydraulic excavator and information regarding abnormality that occurred in the past, menu display for the operator performing various types of setting, and the like. Further, a plurality of display items, of the mechanical gauge display, the breakdown information display, and the menu display, may be displayed on one screen.

The buzzer 17 issues a warning when an obstacle is detected by a plurality of radars. Note that information of the obstacle is also displayed on an image of the surrounding monitoring monitor 15 when the obstacle is detected.

[Overall Configuration of Control System]

Figure 3:
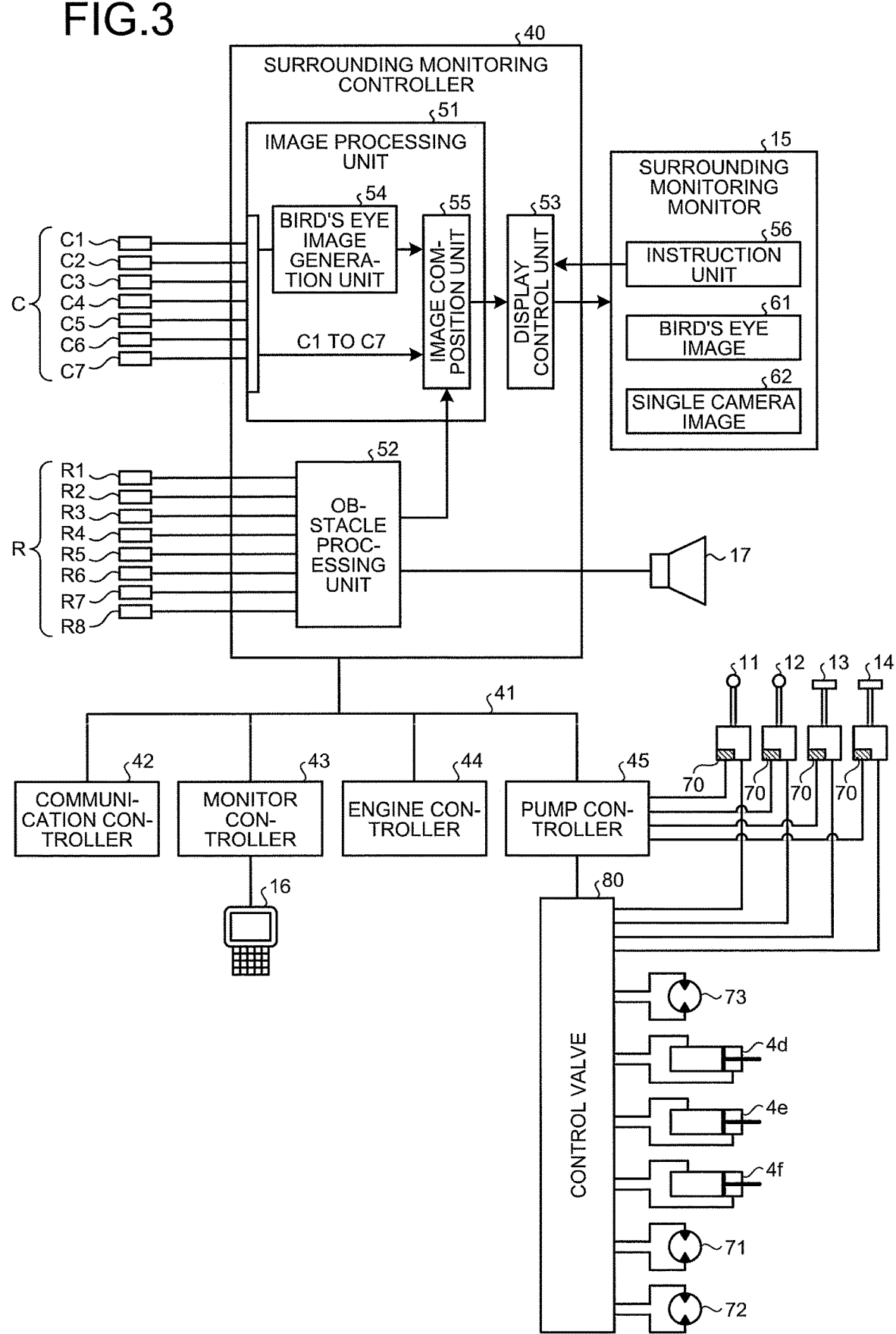
FIG. 3 is a block diagram illustrating an entire control system of the hydraulic excavator.

FIG. 3 is a block diagram illustrating a configuration of an overall control system of the hydraulic excavator 1. As illustrated in FIG. 3, a surrounding monitoring controller 40 is connected with a CAN 41 that is one of in-vehicle networks. A communication controller 42, a monitor controller 43, an engine controller 44, a pump controller 45, operation levers 11 and 12, travel levers 13 and 14, and the like are connected with the CAN 41. Further, a camera group C including a plurality of cameras C1 to C7, a radar group R including a plurality of radars R1 to R8, the surrounding monitoring monitor 15, and the buzzer 17 are connected with the surrounding monitoring controller 40.

The surrounding monitoring controller 40 performs surrounding monitoring control. The surrounding monitoring controller 40 includes an image processing unit 51, an obstacle processing unit 52, and a display control unit 53. Further, the image processing unit 51 includes a bird's-eye image generation unit 54 and an image composition unit 55.

Figure 4:
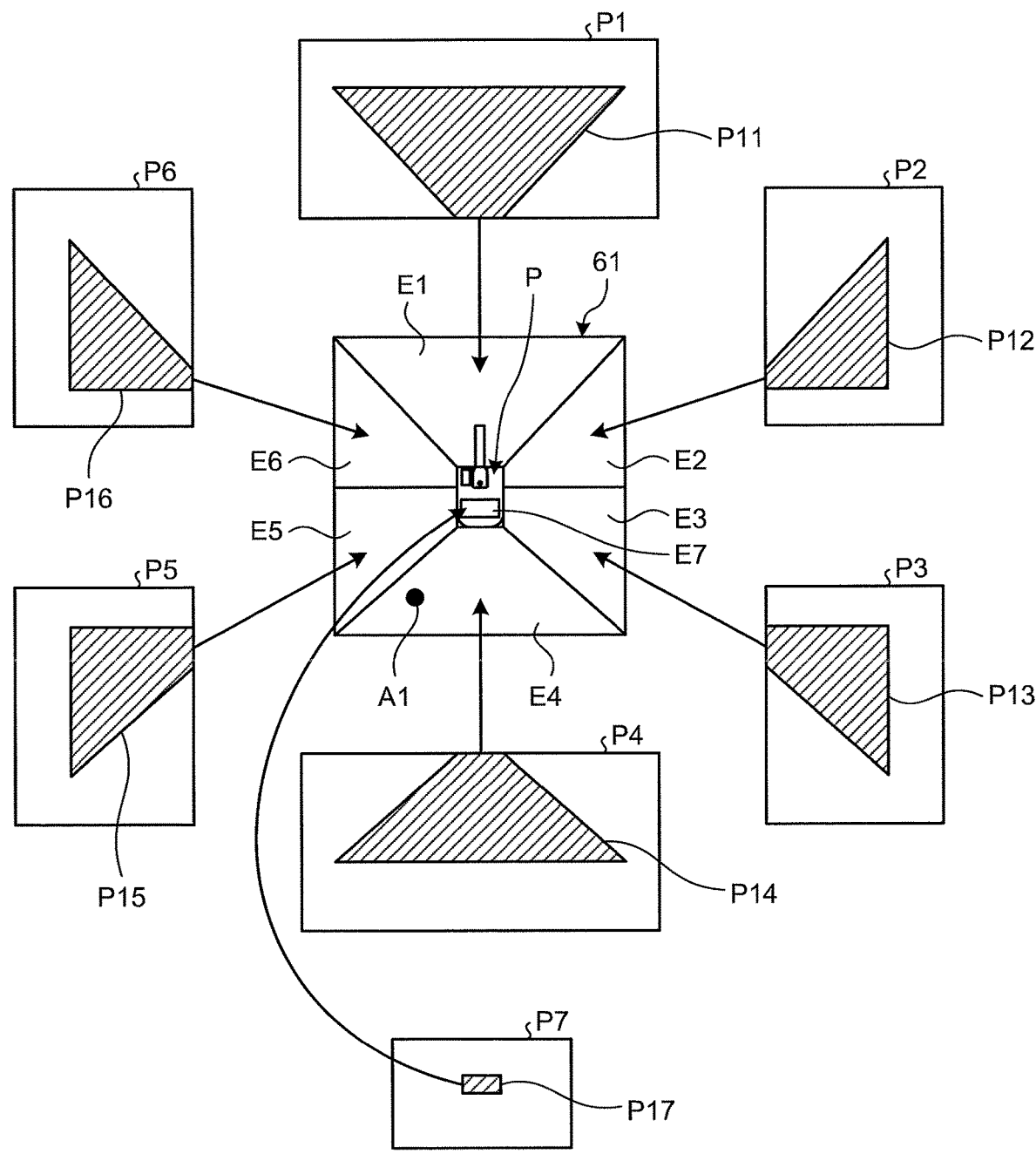
FIG. 4 is an explanatory diagram describing processing of generating a bird's-eye image by a bird's-eye image generation unit.

The bird's-eye image generation unit 54 generates a bird's-eye image 61 based on images obtained from the respective cameras C1 to C7. As illustrated in FIG. 4, the bird's-eye image generation unit 54 converts images P1 to P7 obtained from the respective cameras C1 to C7 into upper viewpoint images. That is, the bird's-eye image generation unit 54 converts the images P1 to P7 into images as viewed from a predetermined virtual viewpoint positioned above the hydraulic excavator 1. To be specific, the bird's-eye image generation unit 54 performs image conversion to project an image from the virtual viewpoint above the hydraulic excavator 1 to a predetermined virtual projection surface corresponding to a ground surface level GL. Following that, the bird's-eye image generation unit 54 cuts out converted images P11 to P17 corresponding to regions E1 to E7 of a frame in which the bird's-eye image is displayed, and composites the converted images P11 to P17 within the frame. An image P corresponding to a plan view of the hydraulic excavator 1 is affixed to the bird's-eye image 61 generated by the bird's-eye image generation unit 54, in advance.

Meanwhile, the obstacle processing unit 52 detects an obstacle on the basis of information of the radars R1 to R8. When the obstacle processing unit 52 has detected the obstacle, the obstacle processing unit 52 sounds the buzzer 17 to inform the detection of the obstacle, and outputs obstacle information, such as a size and a position of the detected obstacle, to the image composition unit 55. The bird's-eye image 61 and the camera images imaged by the respective cameras C1 to C7 are input to the image composition unit 55. When the obstacle information has been input from the obstacle processing unit 52, the image composition unit 55 generates an image obtained by compositing the obstacle information to the bird's-eye image 61 and the camera images. The obstacle information may just have a configuration like a point A1 in a region E4 of FIG. 4, for example, and the bird's-eye image 61 is displayed on the surrounding monitoring monitor 15 after the point A1 is composited to the bird's-eye image 61. In doing so, the operator can easily recognize the position of the obstacle and the distance from the hydraulic excavator.

As another form of the obstacle information, for example, when the obstacle is detected, an outer frame of the regions E1 to E7 of the bird's-eye image 61, where the obstacle exists, or an outer frame of a single camera image 62, where the obstacle exists, may perform blink display (a frame line performs blink display). With this blink display, the operator can easily recognize existence of the obstacle itself. Note that the blink display may be emphasis display, in place of the blink display. For example, the thickness of the frame or the color of the frame may be changed. The above-described obstacle information may be the point A1 illustrated in FIG. 4, or may have any configuration as long as the configuration emphasizes existence of the obstacle and notifies the operator of the existence, such as sounding of the buzzer or the blink display.

The display control unit 53 performs control of displaying the bird's-eye image output from the image composition unit 55, as the bird's-eye image 61, and the camera image selected from the images imaged by the cameras C1 to C7, as the single camera image 62, on the surrounding monitoring monitor 15. Further, operation signals from the operation levers 11 and 12, and the travel levers 13 and 14 are input to the display control unit 53 to perform display control to the surrounding monitoring monitor 15.

The monitor controller 43 is connected with the monitor 16. The monitor controller 43 performs input/output control of various types of information such as information transmitted from various sensors through the CAN 41, and information input through the monitor 16. The monitor 16 can display, as described above, the engine water temperature, the oil temperature, the residual amount of fuel, the warning information that indicates abnormality of a device, and the like.

The pump controller 45 receives signals transmitted from the engine controller 44, the monitor controller 43, the operation levers 11 and 12, the travel levers 13 and 14, and the like, and generates a control command for adjusting a discharge amount of the working oil from the hydraulic pump (not illustrated).

A control valve 80 controls an opening of a main valve that connects between the hydraulic pump, and the boom cylinder 4d, the arm cylinder 4e, the bucket cylinder 4f, a swing hydraulic motor 73, and hydraulic travel motors 71 and 72 in response to the operations of the operation levers 11 and 12, thereby to drive the boom cylinder 4d, the arm cylinder 4e, the bucket cylinder 4f, and the swing hydraulic motor 73. Further, the control valve 80 drives the hydraulic travel motors 71 and 72 in response to the operations of the travel levers 13 and 14. Note that operations amounts of the operation levers 11 and 12, and the travel levers 13 and 14 are detected by operation amount detection units 70, and are output to the pump controller 45 as electrical signals.

[Configurations and Arrangement of Cameras]

Figure 5:
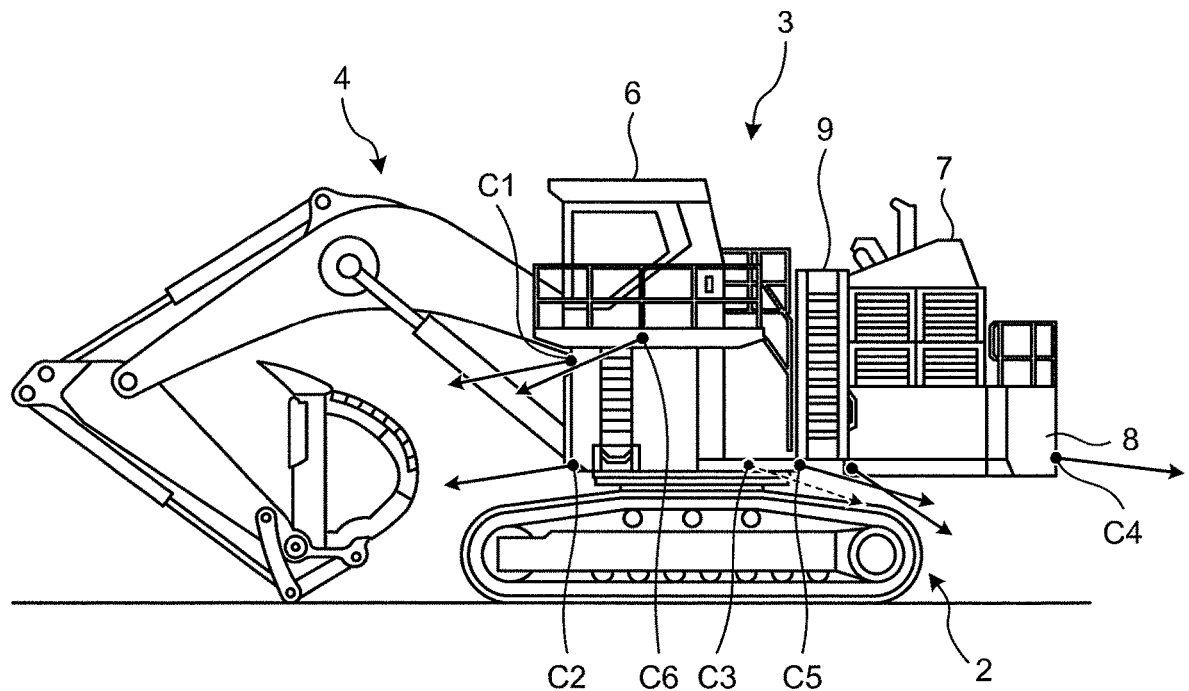
FIG. 5 is a side view illustrating an arrangement of cameras.
Figure 6:
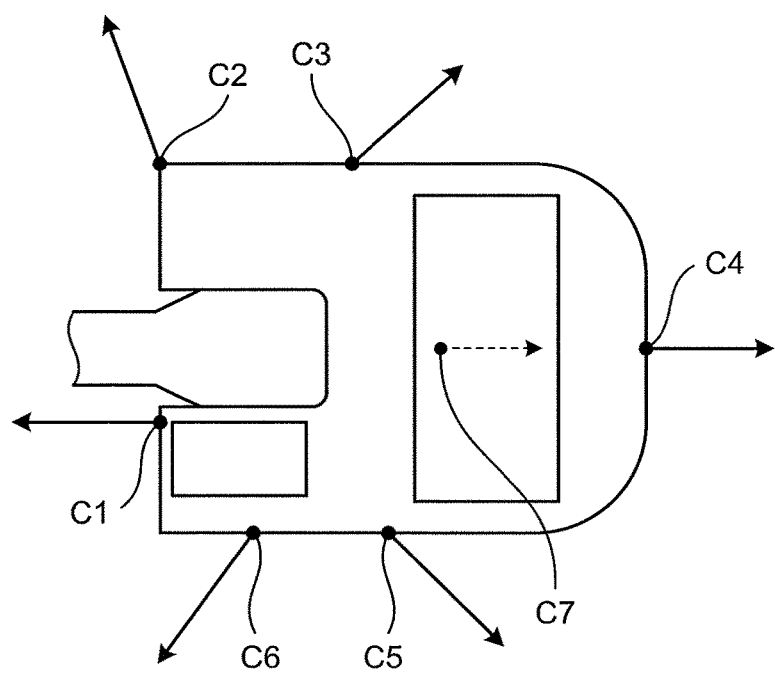
FIG. 6 is a plan view schematically illustrating an arrangement of cameras.

Next, configurations and arrangement of the cameras C1 to C7 will be described with reference to FIGS. 5 and 6. FIG. 5 illustrates a side view of the hydraulic excavator, and FIG. 6 illustrates a plan view of the simplified hydraulic excavator upper swing body. Although the crawler belts are supposed to be displayed in right and left end regions of the upper swing body in FIG. 6, the right and left crawler belts are not displayed and only the upper swing body is displayed for convenience. All of the cameras C1 to C7 may be attached to the upper swing body 3. For example, each of the cameras C1 to C7 has visual field ranges of 120 degrees (60 degrees each to the right and left) in a right and left direction, and 96 degrees in a height direction. As the cameras, a charge-coupled device (CCD) camera can be used.

As illustrated in FIGS. 5 and 6, to be specific, the camera C1 is provided on a front surface of the cab base 5 that is a lower portion of the driver's cab 6 of the upper swing body 3, and images the front of the upper swing body 3. The camera C2 is provided on a right-side front lower part of the upper swing body 3, and images the right front of the upper swing body 3. The camera C3 is provided on a right-side side-surface lower part of the upper swing body 3, and images the right rear of the upper swing body 3. The camera C4 is provided on a rear lower part center of the counter weight 8 arranged in the rear end part of the upper swing body 3, and images the rear of the upper swing body 3. The camera C5 is provided on a left-side side-surface lower part of the upper swing body 3, and images the left rear of the upper swing body 3. The camera C6 is provided on an upper left-side surface of the cab base 5, and images the left front of the upper swing body 3. The camera C7 is provided on a lower part of the power container 7, and images a lower region of the power container 7 and the counter weight 8. Since imaging ranges of the adjacent cameras C1 to C7 overlap with one another, 360-degree surroundings of a close position of the hydraulic excavator can be imaged.

[Configurations and arrangement of Radars]

Figure 7:
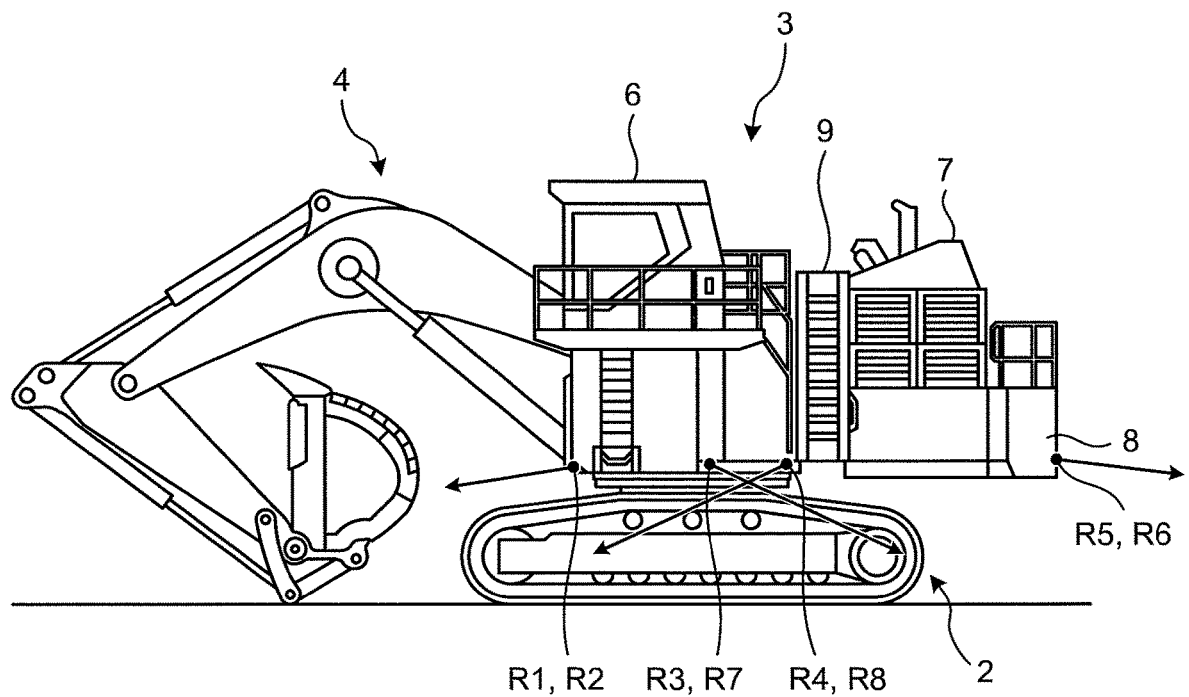
FIG. 7 is a side view illustrating an arrangement of radars.
Figure 8:
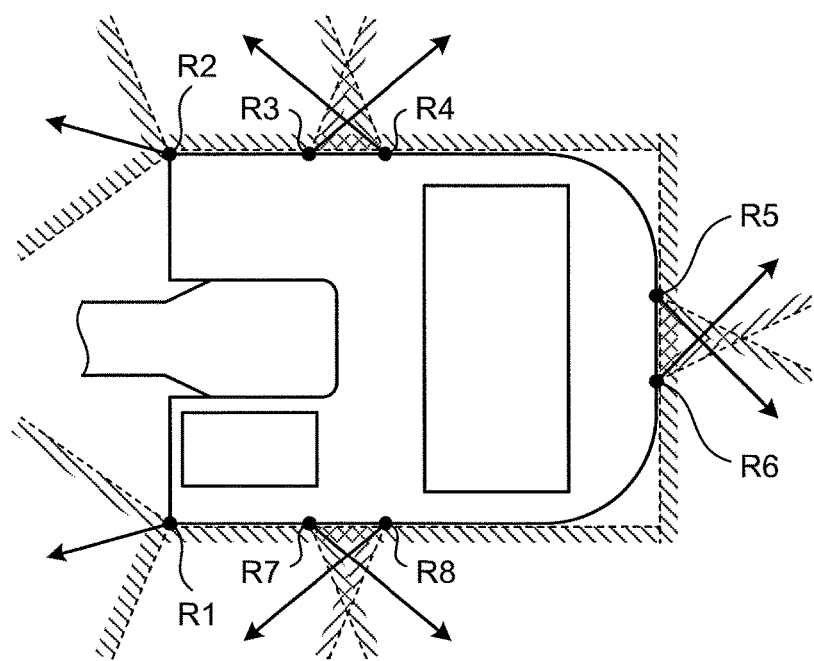
FIG. 8 is a plan view schematically illustrating an arrangement of radars.

Next, configurations and arrangement of the radars R1 to R8 will be described with reference to FIGS. 7 and 8. All of the radars R1 to R8 may be provided on the upper swing body 3. The radars R1 to R8 detect a relative position and direction of an obstacle existing in the surroundings of the hydraulic excavator 1, and the hydraulic excavator 1. For example, the radars R1 to R8 are attached to peripheral parts of the hydraulic excavator 1, as illustrated in FIGS. 7 and 8. Further, the radars R1 to R8 are ultra wide band (UWB) radars with detection angles of 80 degrees (±40 degrees) in an orientation (horizontal) direction and 16 degrees (±8 degrees) in the up and down (vertical) direction, and a maximum detection distance of 15 m or more.

As illustrated in FIGS. 7 and 8, to be specific, the radar R1 is provided on a front lower left end of the upper swing body 3, and detects an obstacle in the left front of the upper swing body 3. The radar R2 is provided on a front lower right end of the upper swing body 3, and detects an obstacle in the right front of the upper swing body 3. Further, installation directions of the radars R1 and R2 are adjusted not to detect the work device 4 such as the bucket 4c, and detection regions of the radars R1 and R2 do not overlap with each other. The radar R3 is provided on a right-side lower part of the upper swing body 3, and detects an obstacle in the right rear of the upper swing body 3. The radar R4 is provided at a right-side side lower part of the upper swing body 3, and detects an obstacle in the right front of the upper swing body 3. Here, the radar R3 is adjacent to the radar R4, and is arranged in front relative to the position of the radar R4. Then, the radars R3 and R4 detect obstacles in the entire right-side surface of the upper swing body 3 by irradiating the entire right-side surface with radar signals to intersect with each other. Further, the radar R5 is provided on a lower part of the counter weight 8 of the upper swing body 3, and detects an obstacle in the left rear of the upper swing body 3. The radar R6 is provided on a lower part of the counter weight 8, and detects an obstacle in the right rear of the upper swing body 3. Here, the radar R5 is adjacent to the radar R6, and is arranged on the right side relative to the position of the radar R6. Then, the radars R5 and R6 detect obstacles in the entire rear surface in the rear of the upper swing body 3 by irradiating the entire rear surface with radar signals to intersect with each other. Further, the radar R8 is provided on a left-side lower part of the upper swing body 3, and detects an obstacle in the left front of the upper swing body 3. The radar R7 is provided on a left-side side lower part of the upper swing body 3, and detects an obstacle in the left rear of the upper swing body 3. Here, the radar R8 is adjacent to the radar R7, and is arranged in the rear relative to the position of the radar R7. Then, the radars R8 and R7 detect obstacles in the entire left-side surface of the upper swing body 3 by irradiating the entire left-side surface with radar signals to intersect with each other.

[Manual Image Switching Processing of Surrounding Monitoring Monitor]

Figure 9:
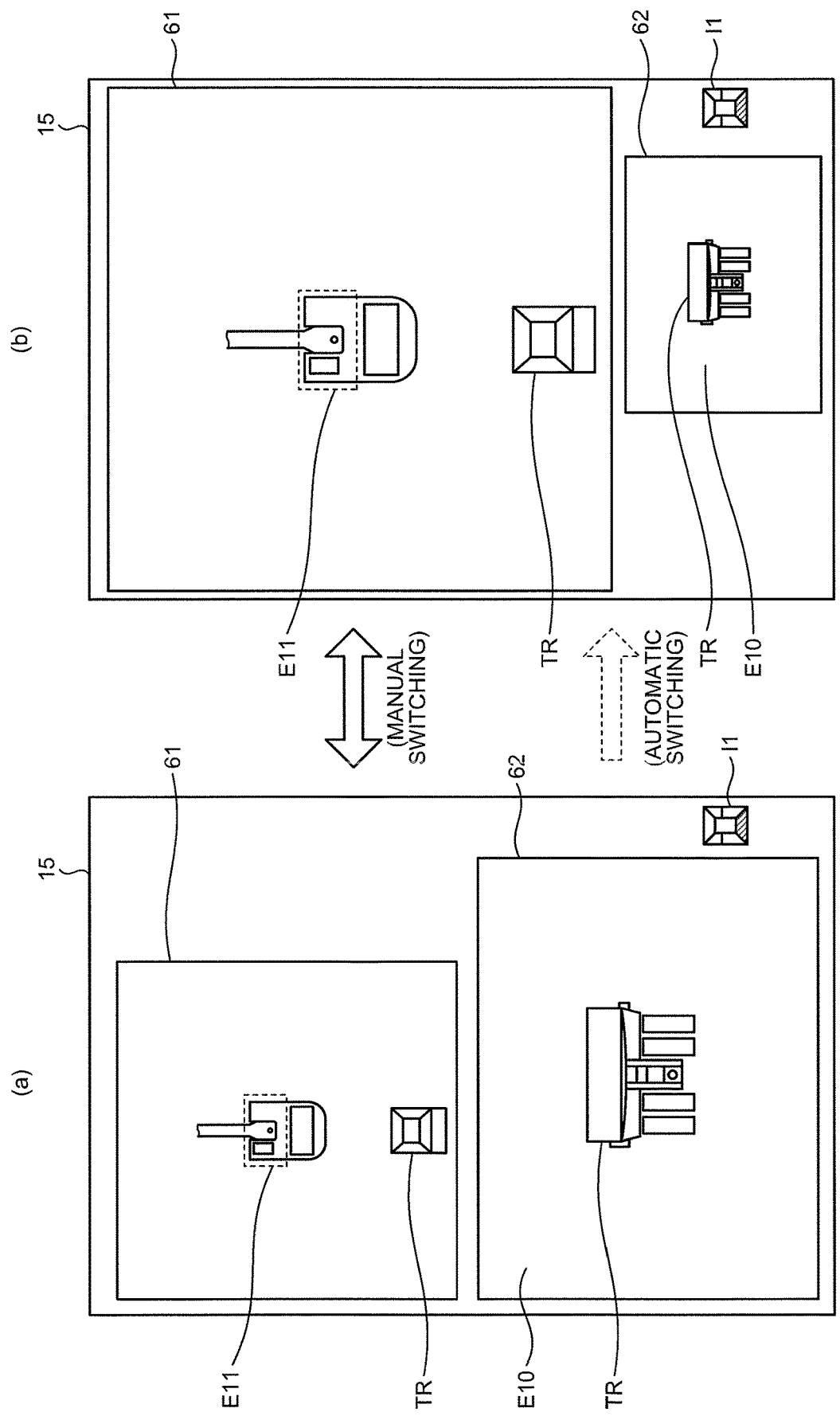
FIG. 9 is a diagram for describing a manual image switching processing of a surrounding monitoring monitor.

The surrounding monitoring monitor 15 illustrated in part (a) of FIG. 9 is an example of an initial screen displayed when a key is turned ON. In part (a) of FIG. 9, the bird's-eye image 61 is displayed in an upper region of a display part of the surrounding monitoring monitor 15, and the single camera image 62 is displayed in a lower region. The region of the bird's-eye image 61 is set to be smaller than the region of the single camera image 62. Further, an icon I1 is displayed in a lower right part in the surrounding monitoring monitor 15. The displayed single camera image 62 is a rear image of the upper swing body 3 imaged by the camera C4. The icon I1 indicates which of the cameras C1 to C7 has imaged the single camera image 62 displayed on the surrounding monitoring monitor 15. The single camera image 62 illustrated in part (a) of FIG. 9 is a rear image, and thus a lower-side region of the icon I1 corresponding to a rear position of the upper swing body 3 is filled. Note that a dump truck TR exists in the rear of the upper swing body 3 in the bird's-eye image 61 and the single camera image 62 illustrated in part (a) of FIG. 9. It can be seen that the dump truck TR is stopped facing outside at a 180-degree position from the front where the work device 4 is arranged, in part (a) of FIG. 9. Note that the surrounding monitoring monitor 15 is configured as a touch panel.

A plan view of the hydraulic excavator is displayed in a central position of the bird's-eye image 61 to cause the operator to easily distinguish the position/direction relationship between the bird's-eye image 61 and the hydraulic excavator. A partial region of the hydraulic excavator is a region E11 (instruction unit 56). When the region E11 is touched by the operator in the state of the screen of the surrounding monitoring monitor 15 of part (a) of FIG. 9, the display control unit 53 enlarges and displays the bird's-eye image 61, and reduces and displays the single camera image 62, as illustrated in part (b) of FIG. 9. Further, when the region E11 in the enlarged bird's-eye image 61 of part (b) of FIG. 9 is touched, the display control unit 53 reduces and displays the bird's-eye image 61, and enlarges and displays the single camera image 62, as illustrated in part (a) of FIG. 9. That is, the operator can manually switch the entire image of the surrounding monitoring monitor 15 of part (a) and part (b) of FIG. 9, using the region E11 as a switch.

Similarly, a region of the single camera image 62 is defined as a region E10 (instruction unit 56). When the region E10 is touched by the operator in the state of the screen of the surrounding monitoring monitor 15 of part (a) of FIG. 9, the display control unit 53 reduces and displays the single camera image 62, and enlarges and displays the bird's-eye image 61, as illustrated in part (b) of FIG. 9. Further, when the region E10 of the reduced single camera image 62 of part (b) of FIG. 9 is touched, the display control unit 53 enlarges and displays the single camera image 62, and reduces and displays the bird's-eye image 61, as illustrated in part (a) of FIG. 9. The bird's-eye image 61 in part (b) of FIG. 9 is enlarged in the display region in the surrounding monitoring monitor 15, compared with the bird's-eye image 61 in part (a) of FIG. 9. Further, in the bird's-eye image 61 in part (b) of FIG. 9, the plan view of the hydraulic excavator displayed in the central portion of the bird's-eye image 61 and the dump truck TR stopped in the rear of the hydraulic excavator are enlarged and displayed, compared with those in the bird's-eye image 61 in part (a) of FIG. 9. That is, an object existing in the surroundings of the hydraulic excavator and displayed on the bird's-eye image 61 is enlarged and displayed.

In the present embodiment, the regions of the bird's-eye image 61 and the single camera image 62 are used as the regions E10 and E11. However, FIGS. 9(a) and 9(b) may be manually switched by touching a separately provided icon or by switching a physical switch. Note that the physical switch may be provided on the surrounding monitoring monitor, a console, the operation lever, or the like.

Note that the size and the content of the bird's-eye image 61 and the single camera image 62 can be automatically switched by automatic image switching processing of the surrounding monitoring monitor described below under a predetermined condition.

[Automatic Image Switching Processing of Surrounding Monitoring Monitor]

Figure 10:
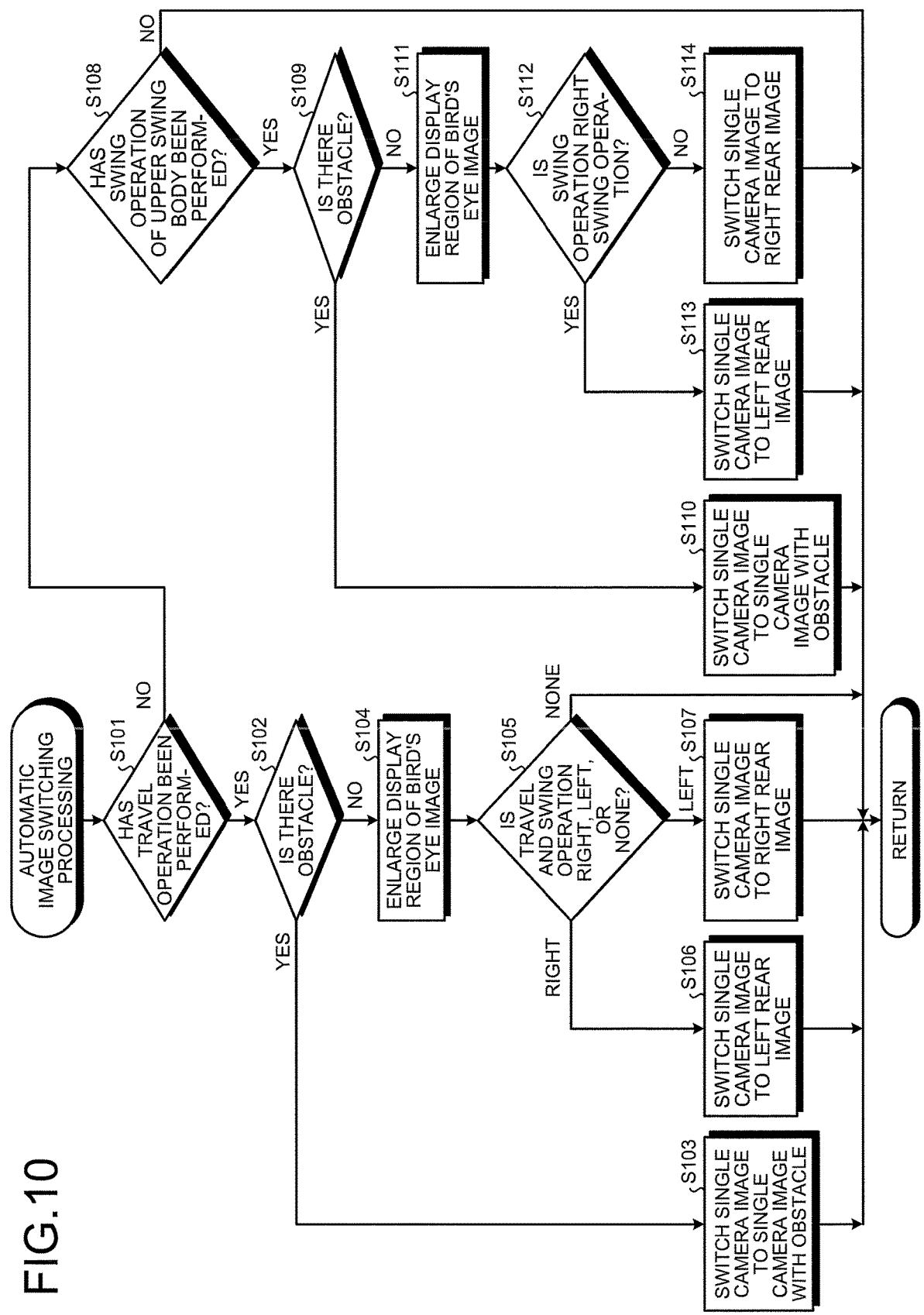
FIG. 10 is a flowchart illustrating an automatic image switching processing procedure of the surrounding monitoring monitor by a controller.

FIG. 10 is a flowchart illustrating an automatic image switching processing procedure of the surrounding monitoring monitor 15 by the surrounding monitoring controller 40. The initial screen of the surrounding monitoring monitor 15 in FIG. 10 is the screen of part (a) of FIG. 9, which is the screen at the time when the key is turned ON. The display control unit 53 is configured to have inputs of the operation signals from the travel levers 13 and 14, and thus the display control unit 53 determines whether a travel operation by the travel levers 13 and 14 has been performed on the basis of the input signals (step S101). When the travel operation has been performed (Yes in step S101), the obstacle processing unit 52 further determines whether detecting the obstacle (step S102). When the obstacle has been detected (Yes in step S102), the single camera image 62 on the screen of the surrounding monitoring monitor 15 is switched to the single camera image 62 including the obstacle in the imaging range (step S103), and the processing returns to step S101.

Meanwhile, when the obstacle is not detected (No in step S102), the bird's-eye image 61 is enlarged (step S104). Note that, in this case, the single camera image 62 is reduced with the enlargement of the bird's-eye image 61. Note that, in the present embodiment, the bird's-eye image 61 has been described in the small state as the initial screen. However, in a case where the bird's-eye image 61 is maximum as the initial screen, the display state is maintained as it is.

By enlarging the bird's-eye image 61 in response to the operation of the travel lever in this way, the operator can easily recognize the obstacle in the surroundings at the time of traveling of the hydraulic excavator.

After that, whether the travel and swing operation by the travel levers 13 and 14 is right, left, or none is determined (step S105). The travel and swing operation is an operation to cause the entire hydraulic excavator 1 to swing without causing the upper swing body 3 to swing by advancing or reversing only one of the right crawler belt and the left crawler belt. When the travel and swing operation is right (that is, only the left crawler belt is advanced, or only the right crawler belt is reversed) (right in step S105), the single camera image 62 is switched to the left rear image by the camera C5 (step S106), and the processing returns to step S101. This is because the rear part (the power container 7, the counter weight 8, and the like) of the upper swing body 3 swings in the left direction at the time of the right swing, and thus the operator is made able to easily recognize the left rear condition of the upper swing body 3. Further, when the travel and swing operation is left (that is, only the crawler belt is advanced, or only the left crawler belt is reversed) (left in step S105), the single camera image 62 is switched to the right rear image by the camera C3 (step S107), and the processing returns to step S101. Further, when no travel and swing operation is made (that is, both the right crawler belt and the left crawler belt are advanced or reversed) (none in step S105), the single camera image 62 is left as the rear image, and the processing returns to step S101.

Meanwhile, when the travel operation is not performed (No in step S101), the display control unit 53 is configured to have the inputs of the operation signals from the operation levers 11 and 12, and thus the display control unit 53 determines whether the swing operation of the upper swing body 3 by the operation levers 11 and 12 is performed on the basis of the input signal (step S108). When the swing operation has been performed (Yes in step S108), whether the obstacle processing unit 52 has detected the obstacle is further determined (step S109). When the obstacle has been detected (Yes in step S109), the single camera image 62 on the screen of the surrounding monitoring monitor 15 is switched to the single camera image 62 including the obstacle in the imaging range (step S110), and the processing returns to step S101.

When the obstacle is not detected (No in step S109), the bird's-eye image 61 is enlarged (step S111). Note that, in this case, the single camera image 62 is reduced with the enlargement of the bird's-eye image 61. In a case where the bird's-eye image 61 is maximum as the initial screen, the display state is maintained as it is.

After that, whether the swing operation is the right swing operation is determined (step S112). When the swing operation is the right swing operation (Yes in step S112), the single camera image 62 is switched to the left rear image by the camera C5 (step S113), and the processing returns to step S101. Meanwhile, when the swing operation is not the right swing operation (No in step S112), that is, the swing operation of the left swing operation, the single camera image 62 is switched to the right rear image by the camera C3 (step S114), and the processing returns to step S101. Meanwhile, when the swing operation of the upper swing body is not performed (No in step S108), the single camera image 62 is left as the rear image, and the processing returns to step S101. Note that, in the present embodiment, the single camera image 62 is switched to the left rear image in the case of the right swing operation, and is switched to the right rear image in the case of the left swing operation. However, the position of the single camera image to switch at the time of the swing operation may be appropriately set. For example, the display may be switched to the right front image or the right rear image at the time of the right swing operation, and to the left front image or the left rear image at the time of the left swing operation so that the operator can know in advance a collision of the work device with the obstacle at the time of swing. Further, the description has been given using the flowchart of FIG. 10 to which the branches such as whether the travel operation has been performed (step S101), whether there is an obstacle (step S102), whether the travel and swing operation is right, left, or none (step S105), whether the swing operation of the upper swing body has been performed (step S108), and whether the swing operation is the right swing operation (step S112) are incorporated. However, the respective branches may be performed in single flowcharts, or these branches may be appropriately combined.

In the automatic image switching processing of the surrounding monitoring monitor 15 in the present embodiment, the bird's-eye image 61 is enlarged when the operation to move the hydraulic excavator 1 is performed using the operation levers 11 and 12 and the travel levers 13 and 14. Therefore, the bird's-eye image 61 by which the entire periphery can be monitored becomes an appropriate size at the time of start of the operation of the hydraulic excavator 1, and a manual operation by the operator can be reduced. Further, the control to switch the single camera image to the appropriate camera image is performed in response to the operation of the hydraulic excavator 1. Therefore, the manual operation by the operator can be reduced.

Although the display screen of the surrounding monitoring monitor 15 is maintained even when a locking lever (a lever that blocks flow channels of hydraulic circuits of all of the work device, swing, and travel) is operated or at the time of parking when swing lock is set, the sounding by the buzzer 17 or the display on the surrounding monitoring monitor 15 may not be performed even when the obstacle is detected by the radars R1 to R8. This is because the operator is annoyed if the buzzer 17 is sounded or the obstacle information is displayed on the surrounding monitoring monitor when a person or a vehicle exists in the surroundings of the hydraulic excavator at the time of parking.

Further, the above embodiment has been described on the assumption that both the bird's-eye image 61 and the single camera image 62 are displayed. However, an embodiment is not limited to the embodiment, and may be an embodiment in which only the bird's-eye image 61 or only the single camera image 62 is displayed on the surrounding monitoring monitor 15. For example, in a case where only the single camera image 62 is displayed, the bird's-eye enlarging processing by steps S104 and S111 includes processing of displaying the bird's-eye image 61 from a state where no bird's-eye image 61 is displayed. In that case, both the bird's-eye image 61 and the single camera image 62 may be displayed, or only the bird's-eye image 61 may be displayed. In a case where both the bird's-eye image 61 and the single camera image 62 are displayed, the bird's-eye image 61 may be larger or smaller than the single camera image 62. Note that the bird's-eye image 61 may just be enlarged from the current bird's-eye image 61, and does not necessarily become the maximum display region.

Further, the mechanical gauge display, the menu display, the breakdown information display, and the like may be displayed on the surrounding monitoring monitor 15 in the above-described embodiment. To be specific, the mechanical gauge display, the menu display, and the breakdown information display may be displayed in place of the bird's-eye image 61 or the single camera image 62, or these pieces of information may be displayed in addition to the bird's-eye image 61 and the single camera image 62 (a single piece of the information may be displayed or a plurality of display items such as the mechanical gauge display and the breakdown information display may be displayed at the same time). Then, the enlarging processing of the bird's-eye image 61 in the above-described embodiment may be applied.

For example, the bird's-eye image is displayed when the operation levers 11 and 12 and the travel levers 13 and 14 are operated, in a case where any of the mechanical gauge display, the menu display, and the breakdown information display is displayed on the surrounding monitoring monitor 15. Therefore, the operator can reliably confirm the surrounding condition no matter what the screen may be displayed before the operation of the levers. Further, for example, the bird's-eye image is enlarged and displayed when the operation lever or the like is operated, in a case where the single camera image, the mechanical gauge display, the menu display, and/or the breakdown information display is displayed in addition to the bird's-eye image. Therefore, the operator can confirm the surrounding condition in more detail. The above-described two examples exhibit similar effect in the case of the manual switching processing.

In the case of the automatic switching processing, the bird's-eye image 61 may be made larger or smaller than the single camera image, the mechanical gauge display, the menu display, and the breakdown information display by the bird's image enlarging processing by steps S104 and S111.

Note that the communication controller 42, the monitor controller 43, the engine controller 44, and the pump controller 45 are connected with various sensors, and whether abnormality has occurred in components in the hydraulic excavator is determined on the basis of sensor detection results. Then, when the abnormality has occurred in any of the components, continuous driving of the hydraulic excavator may not be favorable depending on the content of the abnormality. Therefore, when some sort of abnormality has been determined to occur in the hydraulic excavator, the bird's-eye image may not be enlarged and displayed even if the operation lever or the like is operated.

In addition, in the above embodiment, the case of the travel operation and the swing operation has been described. However, similar enlarging processing may be made when the work machine is operated. In a case where the obstacle exists in the surroundings of the hydraulic excavator, the operator needs to recognize the surrounding condition of the hydraulic excavator.

Therefore, "an operation of the work machine" described in claims include at least any of the travel operation, the swing operation, and the work device operation. Further, as means to detect the operation of the work machine, not only the operation detection of the various operation levers, but also hydraulic pressure change of actuators (the cylinders and the hydraulic motors) with the operation of the operation levers may be detected, for example.

Note that the present invention is not limited to the above-described embodiments, and modifications and improvements within the scope in which the object of the present invention can be achieved are included in the present invention.

In the above-described embodiment, the screen of part (a) of FIG. 9 has been described as the initial screen of the surrounding monitoring monitor 15. However, the screen of part (b) of FIG. 9 may be set to the initial screen. Further, the surrounding monitoring monitor 15 has been provided separately from the monitor 16. However, the present invention is not limited to the embodiment, and the bird's-eye image 61 and the single camera image 62 may be displayed on the monitor 16. Further, the surrounding monitoring monitor 15 has been configured as a touch panel display. However, a regular display without including a built-in touch sensor may be used.

The above-described embodiment has been configured to display the bird's-eye image 61 and the single camera image 62 on the surrounding monitoring monitor 15 at the same time. However, the present invention is not limited to the embodiment, and only a bird's-eye image or only a single camera image may be displayed on the surrounding monitoring monitor 15.

Further, the above-described embodiment has been configured to display only the image imaged by any of the cameras C1 to C7 in the region of a touch panel display 60 where the images imaged by the cameras C1 to C7 are displayed. However, two or more images may be able to be displayed at the same time. Further, in the above-described embodiment, the seven cameras have been provided on the surroundings of the upper swing body 3. However, the surrounding monitoring device may be configured from a less number of cameras than the seven cameras, or may be configured from a larger number of cameras than the seven cameras.

Further, in the above-described embodiment, the radars and cameras have been configured in cooperation with each other. However, the present invention is not limited to the embodiment, and the surrounding monitoring device may be configured from a single camera.

Further, the embodiment has been described on the basis of the mining hydraulic excavator used in a mine or the like. However, the present invention may be applied to a hydraulic excavator used in a construction site.

The above-described embodiment has been described using the hydraulic excavator. However, the present invention may be applied to a work machine such as a dump truck (including a steering and acceleration as the operation levers), a bulldozer, or wheel loader (including a steering and acceleration as the operation levers) as long as it is a work machine.

Figure 11:
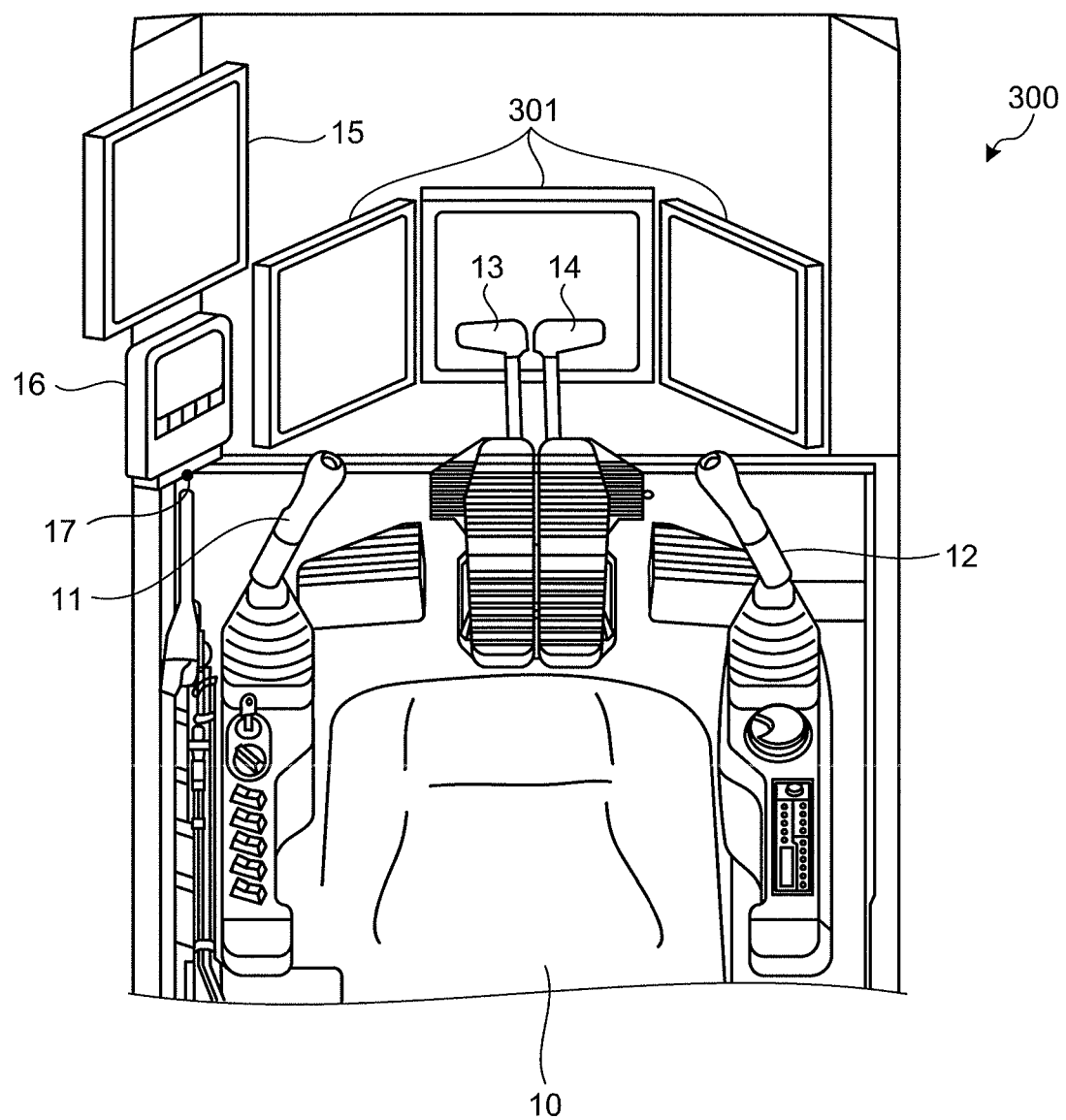
FIG. 11 is a diagram illustrating an example in which the surrounding monitoring monitor is provided to a remote operation seat.
Figure 12:
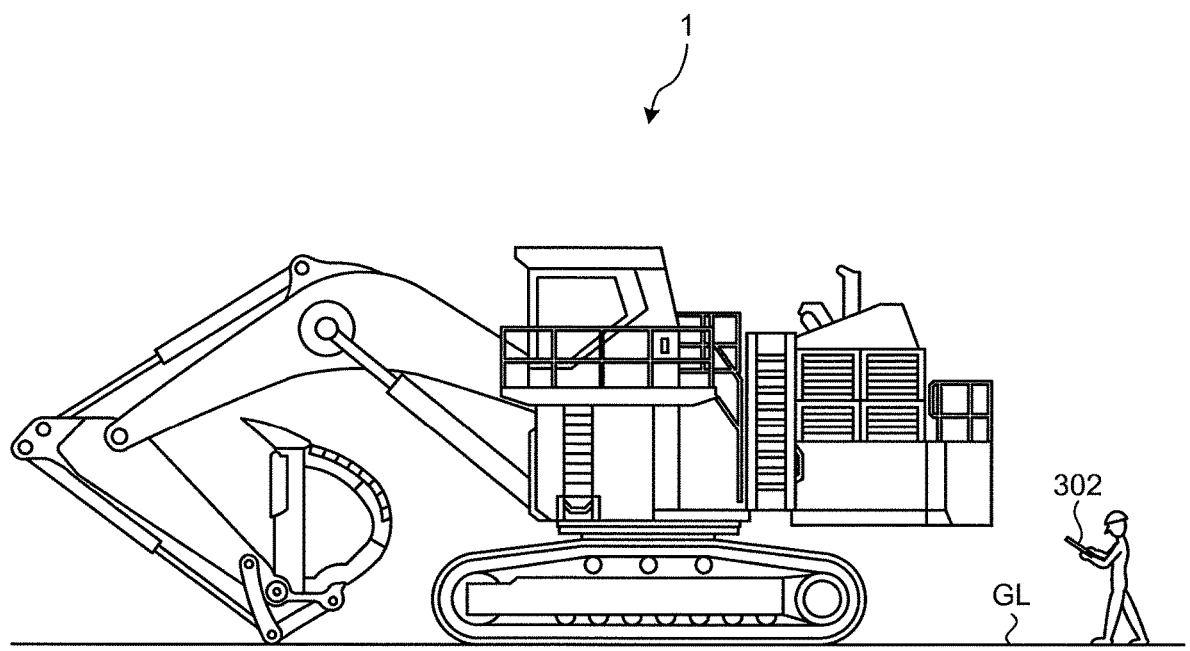
FIG. 12 is a diagram illustrating an example in which the surrounding monitoring monitor is provided to a portable terminal.

Further, the above embodiment has been described using the configuration in which the surrounding monitoring monitor 15 and the buzzer 17 are provided in the driver's cab 6 of the work machine. However, the surrounding monitoring monitor 15 and the buzzer 17 may be provided in another place, for example, a remote operation seat 300 illustrated in FIG. 11, for performing remote operation of the work machine, or a control room in a mine, which totally manages/controls a plurality of work machines. Further, a remote operation monitor 301 illustrated in FIG. 11 may be used as the surrounding monitoring monitor. Further, as illustrated in FIG. 12, the surrounding monitoring monitor 15 and the buzzer 17 may be provided to a portable terminal 302, and an operator may view a bird's-eye image displayed on the portable terminal 302. Here, in a case where the bird's-eye image is displayed on the surrounding monitoring monitor 15 in the remote operation seat 300 or the control room, or in a case where the portable terminal 302 is used as the surrounding monitoring monitor 15 and the buzzer 17, communication means of some sort may be provided to each of the work machine and the remote operation seat 300/the control room/the portable terminal 302, and transmission/reception of information such as the bird's-eye image may be performed.

REFERENCE SIGNS LIST

1 HYDRAULIC EXCAVATOR
2 LOWER TRAVELING BODY
3 UPPER SWING BODY
4*a* BOOM
4*b* ARM
4*c* BUCKET
4*d* BOOM CYLINDER
4*e* ARM CYLINDER
4*f* BUCKET CYLINDER

4 WORK DEVICE
5 CAB BASE
6 DRIVER'S CAB
7 POWER CONTAINER
8 COUNTER WEIGHT
9 UP-AND-DOWN LADDER
10 OPERATOR SEAT
11 and 12 OPERATION LEVER
13 and 14 TRAVEL LEVER
15 SURROUNDING MONITORING MONITOR
16 MONITOR
17 BUZZER
40 SURROUNDING MONITORING CONTROLLER
42 COMMUNICATION CONTROLLER
43 MONITOR CONTROLLER
44 ENGINE CONTROLLER
45 PUMP CONTROLLER
51 IMAGE PROCESSING UNIT
52 OBSTACLE PROCESSING UNIT
53 DISPLAY CONTROL UNIT
54 BIRD'S-EYE IMAGE GENERATION UNIT
55 IMAGE COMPOSITION UNIT
56 INSTRUCTION UNIT
61 BIRD'S-EYE IMAGE
62 SINGLE CAMERA IMAGE
63 REGION
70 OPERATION AMOUNT DETECTION UNIT
71 and 72 HYDRAULIC TRAVEL MOTOR
73 SWING HYDRAULIC MOTOR
80 CONTROL VALVE
300 REMOTE OPERATION SEAT
301 REMOTE OPERATION MONITOR
302 PORTABLE TERMINAL
C CAMERA GROUP
C1 to C7 CAMERA
CT SWING CENTER
E1 to E7, E10, and E11 REGION
GL GROUND SURFACE LEVEL
I1 ICON
P, and P1 to P7 IMAGE
P11 to P17 CONVERTED IMAGE
R RADAR GROUP
R1 to R8 RADAR
TR DUMP TRUCK

The invention claimed is:

1. A surrounding monitoring device of a work machine, the surrounding monitoring device comprising:
   a display unit;
   a plurality of cameras configured to acquire a surrounding condition of the work machine;
   an image processing unit configured to generate a bird's-eye image that indicates the surrounding condition of the work machine on the basis of images imaged by the plurality of cameras;
   a plurality of radars configured to detect an obstacle in a surrounding of the work machine;
   a work machine operation detection unit configured to detect an operation lever and/or travel lever; and
   a display control unit configured to display, on the display unit, the bird's-eye image and/or a single camera image imaged by one or plural cameras from among the plurality of cameras,
   wherein in a case where, if a first image refers to the bird's-eye image and a second image refers to the single camera image, a display size of the second image is larger than a display size of the first image and the first image and the second image are displayed on a same screen of the display unit in a manner that the first image and the second image do not overlap with each other, the image processing unit is configured to, when an operation of the work machine is detected and the obstacle is detected, maintain to display the first image and select the second image, which has an imaging range in which the obstacle is imaged and switch to display the selected second image, and is configured to, when the operation of the work machine is detected but the obstacle is not detected, reduce the display size of the second image and enlarge the display size of the first image, so that the display size of the first image is larger than the display size of the second image and the first image and the second image are displayed on the same screen of the display unit in a manner that the first image and the second image do not overlap with each other.

2. The surrounding monitoring device of a work machine according to claim 1, wherein the work machine operation detection unit detects an operation of an operation lever and/or a travel lever.

3. The surrounding monitoring device of a work machine according to claim 1, further comprising: a plurality of radars that detects an obstacle in the surroundings of the work machine, wherein the display control unit detects the obstacle on the basis of information acquired by the plurality of radars, and displays obstacle information on the display unit when the obstacle exists.

4. The surrounding monitoring device of a work machine according to claim 1, further comprising: an abnormality determination unit configured to determine that an abnormality has occurred in the work machine, wherein the display control unit does not enlarge the bird's-eye image on the display unit even if the operation of the work machine is detected, when the abnormality determination unit determines that some sort of abnormality has occurred in the work machine.

5. A surrounding monitoring system for a work machine the surrounding monitoring device comprising:
   a display unit disposed in a remote location;
   a plurality of cameras configured to acquire a surrounding condition of the work machine;
   an image processing unit configured to generate a bird's-eye image that indicates the surrounding condition of the work machine on the basis of images imaged by the plurality of camera;
   a plurality of radars configured to detect an obstacle in a surrounding of the work machine;
   a work machine operation detection unit configured to detect an operation lever and/or travel lever; and
   a display control unit configured to display, on the display unit, the bird's-eye image and/or a single camera image imaged by one or plural cameras from among the plurality of cameras,
   wherein in a case where, if a first image refers to the bird's-eye image and a second image refers to the single camera image, a display size of the second image is larger than a display size of the first image and the first image and the second image are displayed on a same screen of the display unit in a manner that the first image and the second image do not overlap with each other, the image processing unit is configured to, when an operation of the work machine is detected and the obstacle is detected, maintain to display the first image and select the second image, which has an imaging range in which the obstacle is imaged and switch to display the selected second image, and is configured to, when the operation of the work machine is detected but the obstacle is not detected, reduce the display size of the second image and enlarge the display size of the first image, so that the display size of the first image is larger than the display size of the second image and the first image and the second image are displayed on the same screen of the display unit in a manner that the first image and the second image do not overlap with each other.

* * * * *